United States Patent
Matsui et al.

(10) Patent No.: US 6,368,720 B1
(45) Date of Patent: Apr. 9, 2002

(54) FORMABLE BIAXIALLY-ORIENTED POLYESTER FILM

(75) Inventors: Ryousuke Matsui; Masahiro Kimura; Kohzo Takahashi, all of Shiga (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/437,914

(22) Filed: Nov. 9, 1999

(30) Foreign Application Priority Data

Nov. 20, 1998 (JP) .......................................... 10-330313
Apr. 7, 1999 (JP) .......................................... 11-099589

(51) Int. Cl.$^7$ .......................... B32B 15/08; B32B 27/36
(52) U.S. Cl. ..................... 428/458; 428/35.7; 428/35.8; 428/457; 428/480; 428/910; 528/308; 528/308.1; 528/308.6

(58) Field of Search ................................ 428/35.7, 35.8, 428/457, 458, 480, 910; 528/308, 308.1, 308.6

(56) References Cited

U.S. PATENT DOCUMENTS 5,753,377 A   5/1998   Takahashi et al.

FOREIGN PATENT DOCUMENTS

EP   0 767 049 A2   4/1997

*Primary Examiner*—Vivian Chen
(74) *Attorney, Agent, or Firm*—Schnader Harrison Segal & Lewis LLP

(57) ABSTRACT

A formable biaxially-oriented polyester film has a difference of not more than about 0.007 between the maximum and minimum values of face orientation coefficient as determined in a 20 square cm region of the film, and an average face orientation coefficient of about 0.11 to 0.15 as determined in such film region.

19 Claims, No Drawings

FORMABLE BIAXIALLY-ORIENTED POLYESTER FILM

BACKGROUND OF THE INVENTION

1. Field of the Invention

This invention is directed to formable polyester films. More particularly, it is directed to a formable biaxially-oriented polyester film which is highly formable, greatly resistant to impact, and has superior characteristics as a packaging material for storing materials to achieve a good shelf life. This invention is applicable to laminates, particularly to laminates in which metal, paper, or plastic is used as a substrate, and to packaging containers.

2. Description of the Related Art

Polyester films have heretofore been used in flexible packaging in which polyethylene and polypropylene sheets are laminated together with or without an adhesive. In this instance a sealant layer is brought into direct contact with the contents to be packaged. Little consideration has been given to problems which might arise from contact of the polyester film with the contents.

Recently, however, packaging materials have been diversified and improved. To cope with this trend, applications predominate in which the contents are packaged in direct contact with the polyester film.

Prolonged shelf life of the contents is also required. For these reasons, attention has been drawn to improvements in the qualities of the polyester film, among others, in the characteristics such as formability, minimal eluation, and nonadsorptivity.

In particular, in the case where foods or beverages are packaged, problems may occur in that the contents are susceptible to quality changes due to contact with the polyester film. Altered flavors of the beverages or food, for example, result in decreased value.

Recently common packaging containers have a polyester film disposed over the inner surface of a metallic can. A metallic material is laminated to a polyester film, with or without use of an adhesive, followed by fabrication of the laminate to make a packaging metallic can.

As is widely accepted in the art, the inner and outer surfaces of a metallic can are prevented from corroding by being coated with a solution or emulsion in which a thermosetting resin selected from among a number of epoxies, phenols, and the like is dissolved or dispersed in an organic solvent. However, this conventional coating has the disadvantage that it takes a long time to dry the coating, which lowers productivity, and also creates environmental pollution due to use of organic solvents in large amounts.

In order to solve those problems, it is known that a polyester film may be laminated on a metallic material for use in a packaging can, such as a steel sheet, an aluminum sheet, or a metallic sheet derived from surface treatment such as by plating. In the production of a metallic can by draw forming or ironing of the metallic sheet so laminated, such polyester film is required to have special properties:

(1) Excellent lamination of the film with a metallic sheet.

(2) Excellent adhesion of the film to a metallic sheet.

(3) Excellent formability, with freedom from pinholes and other defects after forming.

(4) Freedom from peeling, cracking, and pinholing, even upon application of impact shocks to a metallic can.

(5) Nonadsorptivity by the film of the flavor components of the contents of a metallic can, and freedom of the film from altering the flavors of the contents due to its eluates (hereinafter referred to as the film's "taste property").

Many proposals have been made to meet the requirements noted above. For example, Japanese Examined Patent Publication No. 64-22530 discloses a polyester film having a specific density and a specific face orientation coefficient, and Japanese Unexamined Patent Publication No. 2-57339 discloses a film resulting from a copolymerized polyester and having a specific crystallinity. These known techniques, however, are not always satisfactory with regard to all of the various characteristics above. In particular, a good balance is difficult to attain between superior taste property and superior formability in applications in which severe forming conditions are necessary with extreme deformation.

SUMMARY OF THE INVENTION

With the foregoing problems in mind, the present invention has created a formable biaxially-oriented polyester film which not only has superior formability, heat resistance, and taste property as a packaging material, but is also suitable for severe modes of forming such as draw forming and ironing, and is excellent in adhesion, impact resistance, and prolonging shelf life.

According to an important feature of the present invention, a formable biaxially-oriented polyester film is provided having a difference of 0.007 or less between the maximum and minimum values of the face orientation coefficient as determined in a 20 square cm region of the film, and an average face orientation coefficient in a range of 0.11 to 0.15 as determined in such a film region.

DESCRIPTION OF THE PREFERRED EMBODIMENTS

The term "polyester", as in the "polyester film" of the present invention, means that the film is constituted of a polymer in which ester linkages chemically bond the main chain. The polyester may usually be obtained by polycondensation of a dicarboxylic acid component and a glycol component. Here, suitable dicarboxylic acid components include, for example, from among aromatic dicarboxylic acids such as terephthalic acid, 2,6-naphthalene dicarboxylic acid, isophthalic acid, diphenyl dicarboxylic acid, diphenylsulfone dicarboxylic acid, diphenoxyethane dicarboxylic acid, 5-sodiumsulfone dicarboxylic acid, phthalic acid and the like, aliphatic dicarboxylic acids such as oxalic acid, succinic acid, adipic acid, sebacic acid, dimer acid, maleic acid, fumaric acid and the like, alicyclic dicarboxylic acids such as cyclohexane dicarboxylic acid and the like, and oxycarboxylic acids such as p-oxybenzoic acid and the like. Suitable glycol components include, for example, aliphatic glycols such as ethylene glycol, propanediol, butanediol, pentanediol, hexanediol, neopentyl glycol and the like, polyoxyalkylene glycols such as diethylene glycol, polyethylene glycol, polypropylene glycol and the like, alicyclic glycols such as cyclohexane dimethanol and the like, and aromatic glycols such as bisphenol A, bisphenol S, and the like.

The structure of the polyester for use in the present invention is not particularly restricted, but it is desired that, in order to improve impact resistance and taste property, an ethylene terephthalate unit and/or an ethylene 2,6-naphthalene dicarboxylate unit be contained in an amount of 95% or more by mol based on the totality of the components of the polyester. Contents of such subunits of 97% or more by mol are more desirable since they permit the film's taste property to be further improved.

The polyester used herein may be copolymerized with another dicarboxylic acid component and/or another glycol component so long as neither taste property nor adherence to a laminate substrate is affected. In such a case, the dicarboxylic acid component and glycol component are chosen from those given above and may be used, respectively, in combination with two or more. Diphenyl dicarboxylic acid and 5-sodiumsulfone dicarboxylic acid are preferred for the purpose of the taste property.

Additionally, the polyester suitable for the present invention may be copolymerizable with a polyfunctional compound such as trimellitic acid, trimesic acid, or trimethylolpropane, provided as no adverse effects are exerted on the advantages intended to be achieved by the invention.

To practice the present invention, the polyester should have a melting point of preferably about 246 to 280° C., and more preferably about 250 to 275° C., with taste property and heat resistance in mind.

To increase formability, lamination, and impact resistance, and to prolong shelf life as desired, the polyester film of the present invention should have a difference (hereinafter called a "variable") of about 0.007 or less between the maximum and minimum values of face orientation coefficient as determined in a 20 square cm region of such film. The face orientation coefficient of the polyester film is taken to mean the numerical value calculated from the following equation:

face orientation coefficient $fn=(n_{MD}+n_{TD})/2-n_{ZD}$ where $n_{MD}$ denotes the refractive index of the film in the lengthwise direction, nTD denotes the refractive index of the film in the widthwise direction, and nzD denotes the refractive index of the film in the thickness direction.

Explanation is now given for the reason the variable of face orientation coefficient of the polyester film should be determined with a film region defined at 20 square cm. This is based on our findings that when a metallic can is produced by laminating the polyester film on a metallic sheet and subsequently subjecting the laminate to draw forming, the size of the film per metallic can is equivalent to the above-defined film region, and that it is necessary to reduce the variable of the face orientation coefficient in such a film region so as to prevent film shaving which would be caused during draw forming.

Consequently, if the variable of face orientation coefficient is set to be over about 0.007 in a 20 square cm region of the polyester film equivalent to the dimensions of one metallic can, film shaving often occurs due to frictional forces which arise between a laminated film and a punch used for draw forming when molding, particularly when producing a DR can by draw forming. Furthermore, the varied face orientation coefficient sometimes brings about delamination between a substrate, such as a metallic sheet or the like, and a polyester film, eventually failing to warrant practical application of the resultant polyester film. More preferably, the variable of the face orientation coefficient should be set to be about 0.005 or less when formability, lamination, and especially adherence after lamination, are taken into account. Even more preferably, such a variable should be set to be about 0.003 or less so that uniform formability can be ensured with prolonged shelf life.

No particular restriction is imposed on the technique in which the variable of the face orientation coefficient is set to be about 0.007 or less in the film region stated previously.

To this end, there may be illustrated a method for preventing spots which come from driving of a motor used for film formation, and a method for preventing spots which come from adherence of a melt-extruded polymer to a casting drum or from stretching of that polymer. To prevent spotting during the course of casting to obtain a uniform unstretched sheet, for example, a method is preferred in which a tape-like electrode is employed to allow a polymer to be adhered to a drum by application of electrostatic charge. Such a tape electrode is preferable, as compared to a wire electrode, because it is conducive to electrical charge concentrated at the point of adherence between the drum and the film, and hence, is effective for precluding spots. The tape electrode is also advantageous in that it is less likely to cause spotting due to vibration of the electrode itself.

Preventing spots during orientation applies stretching conditions and stretching systems, and more specifically, in the case of use of rolls for stretching operations, roundness of the rollers, surface smoothness of the rollers and temperature uniformity of the film undergoing orientation. It is desired, above all, that orientation be effected in the air between hot rollers where the film is located out of contact with the rollers. Also, the film should desirably be prevented from vibration during orientation in the air. To make the film temperature uniform, a method is preferred in which the film is sufficiently heated at a preheating stage prior to orientation, and a method in which the film is preheated at a temperature higher than the stretching temperature. More specifically, when preheating rollers are used, the film should preferably be heated by the use of at least two rollers maintained at the same temperature.

Also, the formable polyester film of the present invention should have an average face orientation coefficient ranging from about 0.11 to 0.15 in a 20 square cm region of such a film so as to yield formability, lamination, and impact resistance at desired levels. The average face orientation coefficient used herein denotes the arithmetic mean derived from those face orientation coefficients determined individually. Average face orientation coefficients of less than about 0.11 are responsible for increased coefficient variables and hence for unsatisfactory formability. In respect of impact resistance and formability, the face orientation coefficient of the polyester film after being laminated should be adjusted to be within the above-specified range. Average face orientation coefficients of more than about 0.15 make it difficult to control orientation of the polyester film laminated on substrate, thus yielding poor lamination. To obtain good lamination, the average face orientation coefficient should more preferably be in the range of about 0.127 to 0.145. The average face orientation coefficient can be set within the specified range, for example, by the use of proper stretching conditions and heat-treating conditions, but without limitation thereto. When productivity is considered, it is desired that orientation be effected at a higher stretching temperature and at a higher draw ratio. Orientation at elevated temperature, however, is not desirable because it may invite irregular stretching tensions and hence adverse stretching spots. In the case where stretching rollers are used to cope with that problem, they are preferably finished on their surfaces with silicone or ceramics. Particularly preferred is a non-blocking silicone used as a surface-finishing material for the rollers. In addition, simultaneous biaxial stretching is desirable as uniform stretching tension is easy to obtain with minimal stretching spotting. Orientation can also be carried out with the film raised to a high temperature, and with temperature uniformity for a shorter period of time, by the use of radiant heat.

To produce the polyester according to the present invention, conventional reaction catalysts and anti-coloring agents may be employed. Suitable reaction catalysts are chosen, for example, from among alkali metal compounds, alkali earth metal compounds, zinc compounds, lead compounds, manganese compounds, cobalt compounds, aluminum compounds, antimony compounds, germanium compounds, titanium compounds and the like. Suitable anti-coloring agents are chosen for example from phosphorus compounds and the like. All of these compounds are illustrative and are not restrictive. Preferably, an antimony compound, a germanium compound, or a cobalt compound is usually added as a polymerization catalyst at an arbitrary stage before polyester production is completed.

As such a production process wherein a germanium compound is used as an example, there may be illustrated a process in which a particulate germanium compound is added as it is to the reaction system, and a process in which a germanium compound is dissolved in advance in a glycol component used as a starting material for polyester production, the latter process being disclosed in Japanese Examined Patent Publication No. 54-22234. Suitable germanium compounds include, for example, germanium dioxide, hydrated germanium hydroxide, germanium alkoxide compounds such as germanium tetramethoxide, germanium tetraethoxide, germanium tetrabutoxide, germanium ethylene glycoxide and the like, germanium phenoxide compounds such as germanium phenolate, germanium β-naphthalate and the like, phosphoric acid-containing germanium compounds such as germanium phosphate, germanium phosphite and the like, and germanium acetate. Germanium dioxide is preferred among these compounds. Suitable antimony compounds include, for example, oxides such as antimony trioxide and the like, and antimony acetate, but without limitation thereto. Suitable titanium compounds include, for example, alkyl titanates such as tetraethyl titanate, tetrabutyl titanate and the like, but without limitation thereto.

When germanium dioxide is used as a germanium compound in producing polyethylene terephthalate for example, a process is preferred in which a germanium element-containing polymer is produced by subjecting a terephthalic acid component and an ethylene glycol component to ester exchange or esterification, subsequently by adding germanium dioxide and a phosphorus compound to the reaction system, and further by effecting polycondensation at high temperature and under reduced pressure until such time that a constant content of diethylene glycol is obtained. In a more preferable process, the resultant polymer undergoes solid phase polymerization at a temperature lower than the melting point thereof and under reduced pressure or in an inert gaseous atmosphere so that the content of acetaldehyde is low, and intrinsic viscosity and terminal carboxyl groups are obtainable as predetermined.

The polyester for use in the present invention should contain the diethylene glycol component in an amount preferably of about 0.01 to 3.5% by weight, more preferably of about 0.01 to 2.5% by weight, and particularly preferably of about 0.01 to 2.0% by weight. By observance of the specified amount of such component, excellent taste properties can be maintained even when the resulting film is subjected to a great deal of thermal stress such as heat treatment during can-production steps, and even retort treatment after can production. This is presumably to improve resistance to oxidative destruction at 200° C. or higher, but any suitable antioxidant may be added in an amount of about 0.0001 to 1% by weight. Furthermore, at the time a polymer is produced, diethylene glycol may be added on condition that the desired characteristics are not adversely affected.

To gain good taste properties, the content of acetaldehyde in the polyester film should be preferably about 25 ppm or below, more preferably about 20 ppm or below. Departures from the specified content often result in deteriorated taste properties. The acetaldehyde content in the film may be set to be about 25 ppm or below, although this is not limited, by a method in which a polyester is heat-treated at a temperature lower than the melting point thereof and under reduced pressure or in an inert gaseous atmosphere in order to remove acetaldehyde generated from thermal decomposition during polyester production by polycondensation, and preferably, the polyester is solid phase polymerization at a temperature of more than about 155° C. but lower than the melting point thereof and under reduced pressure or in an inert gaseous atmosphere, by a method in which melt extrusion is conducted by use of a vented extruder, or by a method in which a high polymer is melt-extruded at an extrusion temperature of the melting point thereof plus about 30° C. or lower, preferably of the melting point thereof plus about 25° C. or lower, and for a short period of time, preferably for an average retention time of about 1 hour or less.

No restriction is placed on the process by which the polyester film of the present invention is produced. For instance, however, a process may be illustrated in which a selected polyester is dried when desired and thereafter supplied to a conventional melt extruder where the polymer is melted and extruded in sheet-like form from a slit-shaped die or tube-like form, followed by adherence of the extrudate on a casting drum as by electrostatic application and by subsequent cold solidification, whereby a non-oriented sheet is obtained. Film formation may be attainable by a tubular or tentering system, but the tentering system is preferable with regard to film qualities. Preferred in such instances are sequential biaxial stretching wherein stretching is effected first lengthwise and then widthwise, or first widthwise and then lengthwise, and simultaneous biaxial stretching wherein stretching is effected both lengthwise and widthwise in a substantially simultaneous manner.

The draw ratio is in the range of about 1.6 to 4.2, preferably of about 1.7 to 4.0, in each of the lengthwise and widthwise directions. Such a draw ratio may be larger in one of the directions or may be identical in the two directions. The stretching speed is preferably in the range of about 1,000 to 200,000%/minute. The stretching temperature may be arbitrary above the glass transition point of a polyester but below the glass transition point plus about 100° C., but is usually preferably in the range of about 80 to 170° C. In particular and preferably, the lengthwise stretching temperature ranges from about 100 to 150° C. and the widthwise stretching temperature ranges from about 80 to 150° C.

The polyester film derived by biaxial orientation is heat-treated. This heat treatment may be conducted in an oven or on hot rollers as is known in the art. The heat-treating temperature may be arbitrary above about 120° C. but below the melting point of the polyester, but is preferably between above about 150° C. and below the melting point of the polyester minus about 5° C. The heat-treating time may also be arbitrary, but is usually preferably in the range of about 1 to 60 seconds. The heat treatment may be done with the polyester film loose in either one of or both the lengthwise and widthwise directions. Moreover, such a film may be re-stretched once or more in each of the two directions.

When lamination and formability are considered, the polyester film of the present invention should preferably comply with the following equation (I) in which the relationship is expressed approximately between the relaxation time (τ1) of a carbonyl carbon atom and the relaxation time (τ2) of 1,4 benzene ring carbon atoms in a relaxation time T1ρ measured by solid high resolution nuclear magnetic resonance spectroscopy (NMR):

$$1.8 \leq \tau1/\tau2 \leq 50 \tag{1}$$

where each of τ1 and τ2 is expressed by units of msec.

When the parameter (τ1/τ2) is set within the above-formulated range, an intermediate phase is provided which is structured with a crystalline portion less mobile in the polyester molecular chain and with an amorphous portion present therein. Because this structure is maintained even after the polyester film is laminated on a metallic sheet, such a film is prevented from becoming crystallized during formation so that superior impact resistance can be attained. A value of (τ1/τ2) less than about 1.8 fails to make the polymer chains sufficiently immobile, thus giving rise to inadequate lamination and also poor impact resistance after formation. Conversely, a value of (τ1/τ2) more than about 50 leads to extreme immobility of the polymer chains with consequent deterioration in lamination and formability.

In view of lamination and formability, it is desired that a relaxation time T1ρ1 of the amorphous portion be longer than about 3 msec when the relaxation time τ1 of the carbonyl carbon is analyzed in a binary system, and about 5 msec or longer is more desirable. Particularly desired is about 8 msec or longer at which the amorphous portion can be made less mobile with crystallization lessened during lamination and forming.

The relationship of ρ1 and ρ2 as well as T1ρ1 can be set to be within about the ranges specified above, although this is not necessarily so restricted, by optimizing the intrinsic viscosity of a polyester to be obtained, the catalyst used, the content of diethylene glycol, and the stretching conditions and heat-treating conditions used for film formation.

To improve handling of the polyester film of the present invention, a particulate material may preferably be contained in an amount of about 0.01 to 5% by weight, which particulate material is arbitrarily selected from among internal particles and external particles of an inorganic or organic type, all such particles being known in the art and having an average particle diameter of about 0.01 to 10 μm. Amounts of less than about 0.01% by weight are responsible for insufficient running and winding of the resulting film and hence for low productivity.

The internal particles can be separated in conventional manner as disclosed for instance in Japanese Unexamined Patent Publications Nos. 48-61556, 51-12860, 53-41355, and 54-90397. Such particles may be used in combination with other particles disclosed in Japanese Unexamined Patent Publications Nos. 55-20496 and 59-204617. Particles of larger than about 10 pm in average particle diameter may produce defective polyester films.

Suitable inorganic particulate materials include, for example, wet silica, dry silica, aluminum silicate, titanium oxide, calcium carbonate, calcium phosphate, barium sulfate, mica, kaolin, clay and the like. Suitable organic particulate materials include particles containing a component such as styrene, silicone, acrylics or like. Preferred among these particulate materials are inorganic particles such as wet silica and dry silica, and organic particles composed of styrene, silicone, acrylic acid, methacrylic acid, polyester or divinyl benzene. The internal particles, inorganic particles and organic particles stated above may be used in combination of two or more.

In consideration of after-lamination formability, substrate covering, impact resistance, and prolonged shelf life, the polyester film of the present invention should preferably substantially satisfy the following equation (2) which is taken to express the relationship between the thickness t (by μm) of the film and the absolute value Δf derived from the difference of face orientation coefficients of the film on its front and back surfaces:

$$0.001 \leq \Delta f \cdot t < 0.120 \tag{2}$$

More than about 0.120 in Δf·t causes the film to greatly and variably deform on its front and back surfaces during forming, inviting cracking, and hence insufficient impact resistance and short shelf life. When Δf·t is less than about 0.001, the film fails to adequately cover the substrate, adversely affecting formability. With regard to substrate covering and film formability, t and Δf may more preferably substantially follow the following equation (3):

$$0.001 \leq \Delta f \cdot t < 0.080 \tag{3}$$

The thickness t of the polyester film according to the present invention should preferably be set in the range of about 5 to 40 μm, and more preferably about 8 to 35 μm, with the result that film formability and substrate covering can be obtained as desired. The technique for Δf·t to be set approximately within the above-specified ranges is not restricted when desirable characteristics other than formability and covering are not deteriorated. An example of the technique may be cited wherein when heat treatment is effected during film formation at a constant film thickness by blowing hot air, hot air is blown on both surfaces of the film with the temperature and flow appropriately adjusted.

Additionally, the film may preferably be surface-treated by corona discharge to improve adhesion so that other characteristics can be improved. In this case, the E value is in the range of about 5 to 50, and preferably about 10 to 45. The E value noted here is the intensity of corona discharge treatment and the function of applied voltage (Vp), applied current (Ip), treatment speed (S) and treatment width (Wt), which function is expressed as E=Vp×Ip/S×wt.

The polyester film of the present invention may be subjected to various coatings, coating compounds, coating methods and coat thicknesses are not particularly restricted insofar as the advantages of the invention are not affected.

The formable polyester film of the present invention is applicable for example to folding forming, draw forming, and ironing, but without limitation thereto. An application is preferred in which the film is fabricated after being laminated on a substrate. Especially preferred is an application wherein the film is subjected to draw forming subsequently to lamination on a substrate.

Suitable substrates to be laminated with the polyester film of the present invention may be chosen from metal, paper, and plastic. For this lamination, an adhesive may be used at an interface between the substrate and the film on condition that the desired characteristics are not unacceptably affected. It is desirable, however, that the polyester film be caused to adhere to the substrate with the use of heat and without the need for an adhesive. Packaging materials produced from metal-polyester film, paper-polyester film, and plastics-polyester film are preferred, in respect of taste properties, since the polyester film is laminated at a smaller thickness, for example, in a packaging container. In such a case, a metallic substrate is particularly desirable as it is a good barrier and is resistant to typical heating and hence is capable of protecting the contents with a longer shelf life.

The polyester film of the present invention is suitable especially for use in containers in which foods and beverages are stored.

Suitable metallic sheets used herein include, for the sake of workability, metallic sheets composed mainly of iron or aluminum, but without limitation thereto.

The metallic sheet made of iron may further have a coating layer of an inorganic oxide disposed on the surface thereof so as to improve adhesion and anticorrosion. This coating layer may be one derived from chemical treatment typified, for example, by chromic acid treatment, phosphoric acid treatment, chromic acid-phosphoric acid treatment, chromic acid electrolysis treatment, chromate treatment or chrome-chromate treatment. Particularly preferred is hydrated chromium oxide in a coat weight of about 5 to 200 mg/$M^2$ as converted to a chromium metal. In addition, a ductile layer derived by plating of a metal may be disposed, which metal is selected, for example, from nickel, tin, zinc, aluminum, gun metal, and brass. For example, tin may be plated preferably in an amount of about 1 to 20 mg/$m^2$ and nickel or aluminum preferably in an amount of about 1 to 25 mg/$m^2$.

Suitable papers used herein include those made to have a pulp content of more than about 90%, but without limitation thereto. A recycled paper may also be useful.

The polyester film of the present invention can be suitably used in covering the inner and outer surfaces of a two-piece metallic can produced by draw forming or ironing. Because of its good adherence and formability associated with metallic substrates, such film is also suitable for covering the lid of a two-piece can, or for covering the body, lid, and bottom of a three-piece can. Among others the film of the present invention is preferably used for covering the inner and outer surface of a two-piece metallic can, and is particularly preferable for a two-piece can for food.

The present invention will now be described by way of the following examples which are provided for illustrative purposes and are not intended to be restrictive of the scope of the appended claims.

Various characteristics were measured and evaluated as indicated below.

(1) Intrinsic Viscosity of Polyester

After being dissolved in o-chlorophenol, a test polyester was measured at 25° C.

(2) Melting Point of Polyester

After being crystallized, a test polyester was measured at a rate of temperature increase set at 10° C./min and with a differential scanning calorimeter (DSC Type 7 manufactured by Perkin Elmer Co.). The peak melting temperature was taken as the melting point.

(3) Relaxation Time T1ρ by Solid High Resolution Nuclear Magnetic Resonance Spectroscopy (NMR)

For solid-decomposable NMR, a spectrometer JNM-GX 270, an amplifier, an MAS controller MN-GSH 27 MU, and probes NM-GSH 27 T, VT, and W, were used; all devices were manufactured by Nippon Electronics Co. T1ρ (vertical relaxation about a rotary coordinate) was measured in relation to a 13C nucleus.

Measurement was made for 1H at a temperature of 24.5° C., at a humidity of 50% RH and at a static magnetic field intensity of 6.34 T (in Teslas) with resonant frequencies of 1H and 13C applied at 270.2 MHz and at 67.94 MHz, respectively. MAS (magic angular shifting) was employed to preclude the effects of anisotropic chemical shifting. The revolution was in the range of 3.5 to 3.7 kHz. The pulse conditions were 90° C. relative to 1H, 4μ sec in pulse width, and 62.5 kHz in locking magnetic field intensity. The contact time of cross polarization was 1.5 msec within which 1H was polarized to 13C. As the retention time T, different times were used which were set at 0.001, 0.5, 0.7, 1, 3, 7, 10, 20, 30, 40 and 50 msec. Measurement was made of the free induction decay (FID) regarding the magnetizing spectra of 13C after lapse of the retention time T (during FID measurement, high-output decoupling was effected to prevent the effects of 1H due to its dipole interaction, and integration was made 512 times to improve the ratio of S/N). Further, the pulse repeating time was set between 5 and 15 seconds. Of the data obtained, the carbonyl carbon atom(164 ppm) and the 1,4 benzene ring carbon atoms(134 ppm) (internal reference silicone rubber in each case: 1.56 ppm) were analyzed as indicated below.

The value of T1ρ is usually approximately expressed by the following equation:

$$I(t)=\Sigma(Ai)\exp(-t/T1\rho 1)$$

where Ai denotes the ratio of component to T1ρ. T1ρ can be determined from the gradient of peak intensity observed relative to each retention time and plotted against semilogarithmic coordinates. Here, the analysis was made in a binary system (T1ρ1: amorphous component, T1ρ2: crystalline component), and the value of T1ρ was counted by the method of least squares and from the following equation:

$$I(t)=fa1 \cdot \exp(-t/T1\rho 1)+fa2 \cdot \exp(-t/T1\rho 2)$$

where fa1 denotes the ratio of component to T1ρ1, fa2 denotes the ratio of component to T1ρ2, and fa1+fa2=1.

Thus, the T1ρ of the carbonyl carbon atom and the T1 ρ of the 1,4 benzene ring carbon atoms were obtained and taken as τ1 and τ2, respectively.

(4) Refractive Index and Face Orientation Coefficient (fn)

With use of a sodium D ray (wavelength: 589 nm) as a light source and methylene iodide as a mounting solution, the refractive indices in the lengthwise, widthwise, and thickness directions ($n_{MD}$, $n_{TD}$, and $n_{ZD}$, respectively) were measured by an Abbe refractometer. The face orientation coefficient fn was calculated from fn=($n_{MD}$+$n_{TD}$)/2−$n_{ZD}$.

The maximum and minimum values of face orientation coefficient in a 20 square cm region of a test polyester film were determined as follows: 100 samples were prepared by cutting the 20 square cm film in a grid pattern of 2 cm with either one film surface selected for measurement, by measuring and calculating the face orientation coefficient of each of all those samples in accordance with the above-noted method, and subsequently by determining the difference, i.e., the variable, between the maximum and minimum values of the face orientation coefficient. The variable of the face orientation coefficient was judged by replicating the measurement three times for each film with the latter constantly positioned widthwise, and by averaging the difference between the maximum and minimum values. In these examples, the face orientation coefficient was measured on the surface of each film sample which was situated opposite to the surface in intimate contact with a casting drum during film formation.

To measure and calculate the absolute value of a difference between the face orientation coefficients on both surfaces of a test film, 10 samples 2 square cm were collected art from optionally chosen regions of the film, followed by measurement of the thickness with a dial gauge and also of the refractive index on both surfaces of the film.

(5) Formability

A tin-free steel sheet having a thickness of 0.22 mm and heated in advance to a temperature between the melting point of a test film minus 5° C. and the melting point plus 50° C. was laminated with the film at a speed of 60 m/min and was then quenched. The film used for this lamination had a face orientation coefficient in the range of 0.03 to 0.04 on the surface not laminated on the metallic sheet.

Next, the metallic sheet thus laminated was formed into a Japanese Standardized No. 2 DR can for canning tuna fish. Evaluation was made by inspecting the top of the resultant metallic can. The grade ○ was noted as acceptable.

Grade ○: deposit of film shavings was absent.

Grade Δ: some deposits of film shavings were on the can top.

Grade x: deposits of film shavings were present around the can top.

(6) Impact Resistance

The above metallic can was filled with water and allowed to drop from a height of 1.2 m on a polyvinyl chloride tile floor. Subsequently, voltage was applied at 6 V to an electrode placed in the water and to the metallic can, and after a lapse of 3 seconds, the value of current flow was read. The measurements of 10 cans were averaged. Grade ○ or higher was noted as acceptable.

Grade ⊙: less than 0.001 mA.

Grade ○: more than 0.001=0.001 mA but less than 0.01 mA.

Grade Δ: more than 0.01 mA but less than 0.1 mA.

Grade x: more than 0.1 mA.

(7) Prolonged Shelf Life

The above metallic can in which tuna flakes in oil had been hermetically sealed was heat-treated at 115° C. for 10 minutes and then stored at 40° C. for 150 days. The can was opened to evaluate its inner surface visually. The grade A or higher was noted as acceptable.

Grade ⊙: the inner surface of the can was not corroded and clean with no flavor change of the contents.

Grade ○: a few rust-like black points were present in the can, but with no flavor change.

Grade Δ: no rust appeared in the can, but the flavor of the contents was slightly altered.

Grade x: rust occurred throughout the can and the contents became turbid.

EXAMPLES 1 TO 4 AND COMPARATIVE EXAMPLES 1 TO 3

In Example 1, polyethylene terephthalate, after being sufficiently dried in vacuo, was melt-extruded at 280° C., and the extrudate was brought into intimate contact with a casting drum, whereby an unstretched sheet was obtained. In such a case, a tape-like electrode was used as an electrode for electrostatic application. Thereafter, the resultant unstretched sheet was sequentially biaxially stretched to produce a biaxially oriented sheet. Lengthwise stretching was effected at a preheating temperature prior to stretching at 115° C. (5 seconds), at a stretching temperature of 113° C., and at a draw ratio of 3.1 such that the film was oriented at a speed of 65,000%/min while in air. Once the film was cooled to 35° C., widthwise stretching was effected at a preheating temperature prior to orientation of 95° C. (5 seconds), at a stretching temperature of 120° C., and at a draw ratio of 3.2. Heat treatment after widthwise orientation was performed at 190° C. (6 seconds). It has been found that the resultant film had physical properties shown in Table 1 and the superior characteristics shown in Table 2.

In Examples 2 and 3, films were produced with certain changes made to the film-forming conditions, except for the lengthwise orientation system of Example 1 and to the polyester materials of the latter example, the physical properties of the resultant films being shown in Table 1. In Example 4, integral biaxial orientation was carried out. These films were superior with respect to their characteristics as is clear from Table 2.

In Comparative Examples 1 to 3, films were produced by the use of different polyester materials and different film-forming conditions. In Comparative Examples 1 and 3, lengthwise orientation was conducted with a film run in a sleeve-tied arrangement between a hot drum and a cold drum, both drums being provided with different peripheral speeds. Comparative Example 2 employed the same lengthwise orientation system as in Example 1. In each of Comparative Examples 1 to 3, a wire electrode was used for electrostatic application to cause a polymer melt to be intimately contacted with a casting drum. The films thus obtained had those physical properties shown in Table 1, but their characteristics were totally unacceptable, as is apparent from Table 2.

Abbreviations and symbols used in Table 1 are explained below.

PET: polyethylene terephthalate.

PET/I*: polyethylene terephthalate copolymerized with isophthalic acid (* denotes the ratio of copolymerization by % by mol).

PET/N*: polyethylene terephtalate copolymerized with 2,6-naphthalene dicarboxylic acid (* denotes the ratio of copolymerization by % by mol).

IV: intrinsic viscosity.

fn: face orientation coefficient.

$\tau 1/\tau 2$: ratio of carbonyl carbon atom ($\tau 1$) to 1,4 benzene ring carbon atoms ($\tau 2$) in a relaxation time T1ρ measured by means of solid high resolution nuclear magnetic resonance spectroscopy (NMR).

T1ρ1: relaxation time of carbonyl carbon atom in amorphous portion analyzed in a binary system in a relaxation time T1ρ measured by means of solid high resolution nuclear magnetic resonance spectroscopy (NMR).

Δf: absolute value of a difference between the face orientation coefficients on both surfaces of a film.

t: film thickness.

TABLE 1

|  | Polyester | IV (dl/g) | Melting point (° C.) | Variable of fn | Average fn | $\tau 1/\tau 2$ | T1ρ1 (msec) | Δf | t (μm) | Δf · t |
|---|---|---|---|---|---|---|---|---|---|---|
| Example 1 | PET | 0.63 | 253 | 0.003 | 0.1405 | 24 | 17.8 | 0.0021 | 15 | 0.032 |
| Example 2 | PET | 0.63 | 253 | 0.004 | 0.1345 | 3.1 | 9.4 | 0.0053 | 26 | 0.138 |
| Example 3 | PET/IN[10] | 0.64 | 233 | 0.002 | 0.1457 | 1.6 | 5.7 | 0.0038 | 25 | 0.094 |
| Example 4 | PET | 0.67 | 256 | 0.006 | 0.1317 | 1.2 | 2.8 | 0.0045 | 30 | 0.135 |
| Comparative Example 1 | PET | 0.63 | 253 | 0.008 | 0.1520 | 2.7 | 0.5 | 0.0063 | 20 | 0.126 |
| Comparative Example 2 | PET | 0.63 | 253 | 0.001 | 0.1653 | 1.2 | 3.2 | 0.0037 | 30 | 0.111 |

TABLE 1-continued

|  | Polyester | IV (dl/g) | Melting point (° C.) | Variable of fn | Average fn | τ1/τ2 | T1ρ1 (msec) | Δf | t (μm) | Δf · t |
|---|---|---|---|---|---|---|---|---|---|---|
| Comparative Example 3 | PET/IN[7] | 0.62 | 240 | 0.009 | 0.1047 | 1.0 | 1.5 | 0.0024 | 15 | 0.036 |

TABLE 2

|  | Formability | Impact resistance | Prolonged shelf life |
|---|---|---|---|
| Example 1 | ○ | ⊙ | ⊙ |
| Example 2 | ○ | ○ | ○ |
| Example 3 | ○ | ○ | Δ |
| Example 4 | ○ | ○ | ○ |
| Comparative Example 1 | X | Δ | X |
| Comparative Example 2 | Δ | Δ | X |
| Comparative Example 3 | X | X | X |

What is claimed is:

1. A biaxially oriented formable polyester film having a difference of 0.007 or less between maximum and minimum values of a face orientation coefficient as determined in a 20 square cm region of said film, and an average face orientation coefficient of 0.11 to 0.15 as determined in said film region.

2. The polyester film according to claim 1, wherein said film has a melting point of 246 to 280° C.

3. The polyester film according to claim 1 wherein said film has a difference of 0.005 or less between the maximum and minimum values of face orientation coefficient in a 20 square cm region of said film.

4. The polyester film according to claim 1, said film being within the range of the equation $0.001 \leq \Delta f \cdot t \leq 0.120$ which expresses the relationship between the thickness t of said film and the absolute value Δf of the difference between the face orientation coefficients on both surfaces of said film, where the unit of t is μm.

5. The polyester film according to claim 1, wherein said film is formable after lamination on a substrate.

6. The polyester film according to claim 5, wherein said substrate is selected from the group consisting of metal, paper, and synthetic resin.

7. The polyester film according to claim 1, wherein said film is formable in a packaging container.

8. The polyester film according to claim 1, wherein said film is formable in a packaging container by means of draw forming.

9. The polyester film according to one of claims 1 and 2, wherein said film is derived from a polyester composed of at least one of an ethylene terephthalate unit and an ethylene 2,6-naphthalene dicarboxylate unit in a content of 95% by mol.

10. The polyester film according to claim 9, wherein said film is within the range of the equation $1.8 \leq \tau 1/\tau 2 \leq 50$ which expresses the relationship of relaxation time of a carbonyl carbon atom (τ1) and relaxation time of 1,4-benzene ring carbon atoms (τ2) in a relaxation time T1ρ measured by means of solid high resolution nuclear magnetic resonance spectroscopy (NMR), where the unit of each τ1 and τ2 is msec.

11. The polyester film according to claim 10, wherein said film has a relaxation time T1ρ1 of a carbonyl carbon atom in amorphous portion of 3 msec or above when the relaxation time τ1 of the carbonyl carbon atom is analyzed in a binary system.

12. The polyester film according to claim 11, wherein said film has an average face orientation coefficient of 0.127 to 0.145 in a 20 square cm region of said film.

13. The polyester film according to claim 10, wherein said film has an average face orientation coefficient of 0.127 to 0.145 in a 20 square cm region of said film.

14. The polyester film according to claim 9, wherein said film has an average face orientation coefficient of 0.127 to 0.145 in a 20 square cm region of said film.

15. The polyester film according to one of claims 1 or 2, wherein said film fulfills the equation $1.8 \leq t1/t2 \leq 50$ which expresses the relationship of relaxation time of a carbonyl carbon atom (τ1) and relaxation time of 1,4 benzene ring carbon atoms (τ2) in a relaxation time T1ρ measured by means of solid high resolution nuclear magnetic resonance spectroscopy (NMR):

where the unit of each of τ1 and τ2 is msec.

16. The polyester film according to claim 15, wherein said film has a relaxation time T1ρ1 of a carbonyl carbon atom in amorphous portion of 3 msec or above when the relaxation time τ1 of the carbonyl carbon atom is analyzed in a binary system.

17. The polyester film according to claim 16, wherein said film has an average face orientation coefficient of 0.127 to 0.145 in a 20 square cm region of said film.

18. The polyester film according to claim 15, wherein said film has an average face orientation coefficient of 0.127 to 0.145 in a 20 square cm region of said film.

19. The polyester film according to one of claims 1 or 2, wherein said film has an average face orientation coefficient of 0.127 to 0.145 in a 20 square cm region of said film.

* * * * *

UNITED STATES PATENT AND TRADEMARK OFFICE
CERTIFICATE OF CORRECTION

PATENT NO.     : 6,368,720 B1                                           Page 1 of 1
DATED          : April 9, 2002
INVENTOR(S)    : Matsui et al.

It is certified that error appears in the above-identified patent and that said Letters Patent is hereby corrected as shown below:

Column 7,
Line 30, please change "$\rho 1$ and $\rho 2$" to -- $\tau 1$ and $\tau 2$ --.

Signed and Sealed this

Eighteenth Day of June, 2002

Attest:

Attesting Officer

JAMES E. ROGAN
Director of the United States Patent and Trademark Office